United States Patent [19]

Hicks, Jr.

[11] Patent Number: 4,822,136

[45] Date of Patent: Apr. 18, 1989

[54] SINGLE MODE OPTICAL FIBER

[75] Inventor: John W. Hicks, Jr., Northboro, Mass.

[73] Assignee: Polaroid Corporation, Cambridge, Mass.

[21] Appl. No.: 621,152

[22] Filed: Jun. 15, 1984

[51] Int. Cl.⁴ ............................................... G02B 6/10
[52] U.S. Cl. ................................. 350/96.34; 350/96.30
[58] Field of Search ............... 350/96.30, 96.31, 96.32, 350/96.33, 96.34

[56] References Cited

U.S. PATENT DOCUMENTS

| 3,778,132 | 12/1973 | Pinnow et al. | 65/3.12 X |
| 4,065,280 | 12/1977 | Kao et al. | 65/3.12 |
| 4,082,420 | 4/1978 | Shiraishi et al. | 350/96.31 |
| 4,206,968 | 6/1980 | Suganuma | 350/96.34 X |
| 4,210,386 | 7/1980 | Aravjo et al. | 350/96.31 |
| 4,367,013 | 1/1983 | Guerder et al. | 350/96.34 |
| 4,372,648 | 2/1983 | Black | 350/96.33 |
| 4,441,788 | 4/1984 | Guerder et al. | 350/96.34 |
| 4,504,114 | 3/1985 | Arrington | 350/96.34 |
| 4,557,561 | 12/1985 | Schneider | 350/96.34 |

FOREIGN PATENT DOCUMENTS 1029993  4/1978  Canada ............................ 350/96.34

Primary Examiner—William L. Sikes
Assistant Examiner—Akm E. Ullah
Attorney, Agent, or Firm—Francis J. Caufield

[57] ABSTRACT

A single mode optical fiber of stepped index of refraction. Both core and cladding are fabricated of pure fused silica doped with a small base percentage of fluorine to substantially eliminate hydroxyl ions and reduce viscosity. In addition to the base amount of fluorine, the cladding contains a further amount for lowering its index of refraction relative to that of the core and for further reducing viscosity.

4 Claims, 1 Drawing Sheet

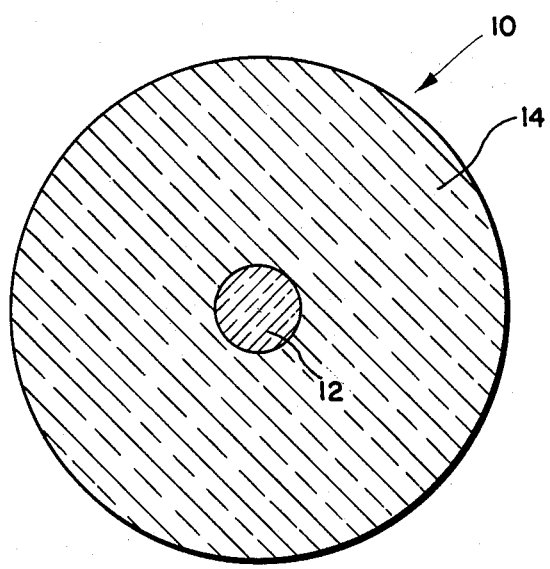

SINGLE MODE OPTICAL FIBER

BACKGROUND OF THE INVENTION

This invention in general relates to dielectric waveguides, and in particular to optical fibers for use in communications.

The use of optical fiber as a medium for transmitting high volumes of information over large distances is now a well-established practice known throughout the communications industry. In fact, the performance of optical fibers has improved so steadily since the possibility of their use for communications purposes became evident in 1966 that some believe that they could displace conventional copper wire based systems as early as the turn of the century. This rapid progress has been due largely to developments in materials identification and in methods for fabricating fiber.

Optical fibers are thin filaments of glass having a central region of high index of refraction surrounded by a sheath or cladding region of lower index, a structure which causes optical radiation properly injected into the fiber end to propagate along the length of the fiber and emerge from the distant end.

The performance of optical fibers for communications is chiefly determined by optical loss or attenuation and by dispersion. Losses are caused by absorption, scattering, and imperfect geometry or structural defects in the fiber and dispersion, which causes a smearing of light pulses leading to noise, is of two types. One type of dispersion is a change in refractive index with wavelength due to the material itself, and the other is referred to as modal dispersion which is due to differences in the optical path lengths for different transmission modes.

For optical fibers to be competitive with copper wire based systems, they must, for transmission of high data rates over long distances have low transmission losses and produce low signal distortion. In order to obtain such high quality optical fibers, extremely pure glasses are required since even traces of certain impurities such as Fe or Cu increase the attenuation drastically. And, in order to have wide band transmission, it is necessary to carefully control the refractive index profile and the material dispersion in the fiber since it determines in large part the distortion of the signals transmitted along the fiber.

To meet these requirements, those skilled in the art have developed various techniques by which optical fibers can be successfully fabricated. These techniques are, by and large, based upon the formation of silica based glass from appropriate glass precursor vapors. Techniques used have been the soot process (U.S. Pat. Nos. 3,711,262 and Re. 28,029); the modified chemical vapor deposition process (U.S. Pat. No. 4,217,027); and the vapor axial deposition process (U.S. Pat. Nos. 3,966,446; 4,135,901 and 4,224,046). As a result of these processes and improvements to them, optical fibers are now routinely fabricated in commercial processes with losses less than two db/km in certain parts of the optical region of the spectrum.

One example of a significant improvement over the processes based on vapor phase formation of fibers is the reduction in the hydroxyl ion (OH) content to low levels sufficient not to present a problem in undue absorption in the wavelength regions of interest. It was known that a successful fiber of low attenuation required that the hydroxyl ion content had to be below a few parts per million because undesirable OH absorption at overtones of the fundamental stretching vibration of OH centered around 2.8 microns. These overtones give rise to absorptions at 1.4 microns and 970 and 750 nm, and thus interfere with the transmission band of interest in glass. Thus, the OH ion which is ever present had to be precluded from the final fiber if low transmission losses were to be achieved. The elimination of the OH ion has been a particularly vexing problem for the industry because of its presence in undesirable quantities in most of the vapor phase processes. To solve this problem, chlorine has been used as a drying agent to remove the OH ion from preforms made from flame hydrolysis as shown and described in U.S. Pat. No. 3,933,454. Fluorine has also been proposed as a drying agent as shown and described in U.S. Pat. No. 4,065,280 and as a dopant in a fiber for purposes of reducing hydroxyl ion content as shown and described, for example, in U.S. Pat. No. 4,441,788. In addition, fluorine has been used to reduce cladding index (U.S. Pat. No. 4,082,420).

To improve the transmission bandwidth, those skilled in the art chose to use single mode fibers rather than multimode fibers because the use of single mode fibers eliminated or virtually eliminated dispersion manifested as pulse spreading due to differences in optical path length between the various modes propagating in a multimode fiber and to material dispersion as well.

Initial fabrication of single mode fibers were of the step index type in which the core was of uniform index of refraction and the cladding was primarily of a uniform lower index of refraction. Early fibers comprised silica cores with doped claddings of, for example, borosilicate and later fluorosilicate. Later fibers included undoped cores of, for example, germania silicate and silica claddings. However, these designs presented manufacturing problems because of the high temperatures necessary to process deposited pure silica.

The later fibers included germania silicate cores and phosphosilicate claddings. Phosphorus in the cladding simplifies the manufacturing process because it lowers the melting temperature of silica. Furthermore, the removal of boron from the fiber, whose presence likewise simplifies manufacturing due to lowered melting temperatures, avoids the relatively low wavelength infrared absorption edge associated with borosilicate glasses.

In spite of the many innovations made in this art, improved fiber material structures and manufacturing processes are still needed to assure low loss and low dispersion which, in turn, translate into long distances between repeaters and high telecommunications capacity. Accordingly, it is a primary object of the present invention to provide a single mode optical fiber of low attenuation and dispersion and favorable characteristics for fabrication.

Other objects of the invention will, in part, be obvious and will, in part, appear hereinafter. The invention accordingly comprises the optical fiber possessing a construction, material composition, and arrangement exemplified in the detailed disclosure which follows.

SUMMARY OF THE INVENTION

This invention in general relates to dielectric waveguides and in particular to the construction of an optical fiber suitable for use in communications systems operating in the optical region of the spectrum.

The optical fiber of the invention is a single mode fiber of stepped index intended to operate at a nominal wavelength of 1.34 micrometers, more or less. Both its core and cladding are fabricated of pure fused silica containing a base amount of fluorine for the purpose of substantially eliminating hydroxyl ions and lowering viscosity. The cladding additionally includes an amount of fluorine in excess of the base amount to reduce its index of refraction relative to that of the core and further lower its viscosity.

The fiber is drawn from a preform fabricated from a rod and tube technique.

BRIEF DESCRIPTION OF THE DRAWING

The novel features that are considered characteristic of the invention are set forth with particularity in the appended claims. The invention itself, however, both as to its organization and method of operation, together with other objects and advantages thereof, will be best understood from the following description of the illustrated embodiments when read in connection with the accompanying drawing which is an enlarged cross-sectional view of the optical fiber of the invention.

DETAILED DESCRIPTION

The optical fiber of the present invention is single mode having a cross-section as shown in the FIGURE where the fiber is designated at 10. As seen there, the fiber 10 comprises a core 12 of uniform index of refraction surrounded by cladding layer 14 whose index of refraction is also uniform and lower than that of the core 12. The nominal wavelength at which the fiber 10 is to be operated is 1.34 micrometers more or less and at this wavelength the index of refraction of the core is preferably between 1.4454 and 1.4446 while the cladding index is lower by between 0.0035 and 0.0069 index units so that the numerical aperture (NA) of the fiber 10 is between 0.1 and 0.2.

The nominal core diameter is approximately 8.0 micrometers and the cladding outside diameter is 120 micrometers.

Fiber 10 is drawn in a conventional manner but from a preform that is fabricated in a manner to be described such that its core and cladding, 12 and 14, are substantially free of hydroxyl ions, its viscosity is low so that it can be drawn at low temperatures, and its material dispersion is small.

The composition of the core 12 is pure fused silica ($SiO_2$) lightly doped with fluorine to reduce its hydroxyl ion content, lower its viscosity, and minimize its material dispersion. For these purposes, the percentage of fluorine added to the pure fused silica in the core 12 is preferably within the range of 0.2 to 0.4 mole percent.

For the range of index preferred for the cladding 14, its material composition is also of pure fused silica with 0.2 to 0.4 mole percent of fluorine added for the same reasons for doping the core 12 with fluorine and an additional 0.8 to 1.61 mole percent to reduce the cladding index of refraction to be within the preferred range.

The procedure to be used to fabricate the preform from which the fiber 10 is to be drawn requires first forming a consolidated rod of the material composition of the core and then inserting this rod into a consolidated tube of the material composition of the cladding and then collapsing the tube and cladding in an appropriate atmosphere which tends to maintain the fluorine levels in core and cladding.

The rod is prepared by first depositing $SiO_2$ soot on a mandrel of suitable composition via an outside vapor deposition method (OVD) by burning silicon tetrachloride ($SiCl_4$) in an oxygen-hydrogen flame that is produced in front of a burner nozzle which is directed at the mandrel as it is rotated in a controlled way. After deposition of the required thickness of silica soot, the mandrel is removed and the porous soot is placed into a dehydration and consolidation furnace where the soot is heated to approximately 1,000° C. in a partial chlorine atmosphere to remove residual water. After this drying step, fluorine is diffused into the soot by introducing a suitable fluorine compound into the furnace and heating to about 1,200° C. to virtually eliminate the hydroxyl ion content. The partially fluorinated (0.2-0.4 mole percent) soot cylinder is then subjected to further heat treatment in a fluorine and helium containing atmosphere to coalesce the soot cylinder into a solid fully compacted cylinder without any voids. The resultant tube is then drawn down into a solid rod in an atmosphere of fluorine and helium to produce a rod stock for the core while not allowing any of the fluorine to boil away. This drawn rod is then cut up into smaller sections, each to be used as core rod.

The fluorine doped tube is made by a process which is similar to that for fabricating the core rod. Here, one starts with a tube of high quality silicon dioxide or other material suitable to function as a mandrel and then deposits on the outside of this tube with a chemical vapor deposition method a soot of pure fused silica. After deposition of the required thickness of soot, the mandrel is then removed and the remaining soot tube thermally treated, in a gaseous atmosphere containing chlorine and then fluorine as before. Both enter the porous $SiO_2$ layer and replace the OH ions located there. This partially fluorinated soot tube is then subjected to a higher heat treatment in a fluorine and helium containing atmosphere to coalesce the soot layer into a solid fully compacted layer without any voids.

The core rod is inserted inside of the tube and both are then placed in a fluorine containing atmosphere and then raised to a temperature where the two collapse and fuse. Having done this, one then has a preform from which the fiber 10 is drawn in a conventional manner or else the tube is collapsed onto the rod during the drawing process.

Thus, the fiber 10 is comprised of a core which is lightly doped with fluorine and therefore, because of the dehydration properties of fluorine, has a low OH or water content, thereby providing it with extremely low loss characteristics on the order of less than 0.1 db/km at the wavelength at which it will be operated. The small difference in index between the core and the cladding also permits the numerical aperture to be relatively small, thereby maximizing the core size, a desirable property for a single mode fiber. In addition, the cladding also containing fluorine doping is of extremely low loss quality and it is believed that both fluorine cladding have low material dispersion characteristics therefore making the structure an ideal candidate for high bandwidth transmission. Moreover, with the relatively large core radius, requiring but a small index difference between core and cladding, the contribution to dispersion due to the waveguide geometry at the operating wavelength is minimized and approaches that due to material dispersion alone which, in this case, is already minimal compared with the base pure fused silica.

It will be obvious to those skilled in the art that other changes may be made in the above-described embodiment without departing from the scope of the invention. For example, it is entirely possible to construct the tube by using an inside vapor deposition process and afterwards heat treating in a fluorine atmosphere to dope the pure silica soot created in this way. If this is done, then no coring is required and the final fiber structure has an additional layer beyond the cladding, and this layer is of the quality of the tube which serves as the mandrel. Consequently, it is intended that all matter contained in the above description or shown in the accompanying drawing shall be interpreted as illustrative and not in a limiting sense.

What is claimed is:

1. A single mode, all glass, optical fiber comprising a core consisting essentially of pure fused silica and fluorine uniformly distributed throughout said core in a given concentration and a cladding consisting essentially of pure fused silica and fluorine uniformly distributed throughout said cladding in a concentration higher than that of said concentration of fluorine in said core.

2. The optical fiber of claim 1 wherein said amount of fluorine in said core is within the range of 0.2 to 0.4 mole percent.

3. The optical fiber of claim 1 or 2 wherein said amount of fluorine in said cladding is within the range of 0.91 to 1.81 mole percent.

4. The optical fiber of claim 1 wherein the index of refraction of said core is within the range of 1.4454 and 1.4446 and that of said cladding is lower by between 0.0035 and 0.0069.

* * * * *